United States Patent [19]

Gustavsson et al.

[11] 3,836,752

[45] Sept. 17, 1974

[54] READING APPARATUS FOR A PROGRAM CONTROL SYSTEM

[75] Inventors: Tommy Henning Bruno Gustavsson, Skarholmen; Karl Gosta Karden, Nacka; Sven Peter Jonas Westerberg, Saltsjo-Boo, all of Sweden

[73] Assignee: Atlas Copco Aktiebolag, Nacka, Sweden

[22] Filed: Nov. 17, 1972

[21] Appl. No.: 307,564

[30] Foreign Application Priority Data

Nov. 22, 1971 Sweden ............................ 14890/71

[52] U.S. Cl....... 235/61.11 J, 235/201 FS, 178/17 B

[51] Int. Cl. ............................................ G06k 7/02

[58] Field of Search... 235/61.11 J, 61.11 R, 201 R, 235/201 FS; 178/17 A, 17 B

[56] References Cited

UNITED STATES PATENTS

| | | | |
|---|---|---|---|
| 2,563,290 | 8/1951 | Thomas et al. | 235/61.11 J |
| 3,593,003 | 7/1971 | Paige | 235/61.11 J |
| 3,624,358 | 11/1971 | Bevis | 235/61.11 R |
| 3,719,802 | 3/1973 | Boyer | 235/61.11 R |
| 3,735,771 | 5/1973 | Panissidi | 235/201 FS |

*Primary Examiner*—Daryl W. Cook
*Attorney, Agent, or Firm*—Flynn & Frishauf

[57] ABSTRACT

An apparatus for stepwise advancing and reading a record carrier in the form of a perforated tape, the tape being clamped between two blocks which have aligned channels that form pneumatic signal lines from one block to the other when there are holes in the tape in registration with channels in the blocks. One reader block is fixed and the other is spring biased open and moved to clamping position by a pneumatic piston. The tape is reeled over a driver roller having a cam curve. A lever mechanism is connected to the movable block and engages with a cam on the driver roller so as to transform the movement of the movable block away from its clamped position into an advancing movement of the tape.

33 Claims, 7 Drawing Figures

READING APPARATUS FOR A PROGRAM CONTROL SYSTEM

This invention relates to a reading apparatus for a program control system, and more particularly to such an apparatus comprising two cooperating blocks, one of which is fixedly mounted in a frame of the apparatus and the other of which is movable towards and away from the fixed block so as to be able to clamp firmly a record carrier between the blocks whereby to permit for a reading of the record carrier, and an advancing device to advance stepwise said record carrier. Particularly, the invention relates to a reading device of this kind adapted for a pneumatically reading of a record carrier in the form of a perforated tape or perforated card.

In such a device of the prior art, a pneumatic cylinder is used to perform the clamping movement and another pneumatic cylinder is used to perform the stepwise advancing movement. In such a construction, there must be a control circuit to ensure that an advance motion does not start until the record carrier has become released. Still, there is always a risk of a failure that results in an advance of the record carrier being started when the record carrier is still clamped, and, as a result, the record carrier will usually be destroyed.

It is therefore an object of the invention to provide a reading device of the kind referred to which has a simplified advancing device as compared to prior reading devices, this simplified advance device permitting a simplified control system and being advantageous in that it can not destroy the record carrier even if there would be a failure in the clamping device.

The invention will be further described with reference to the accompanying drawings which show two embodiments of the invention.

Figures 6, 7:
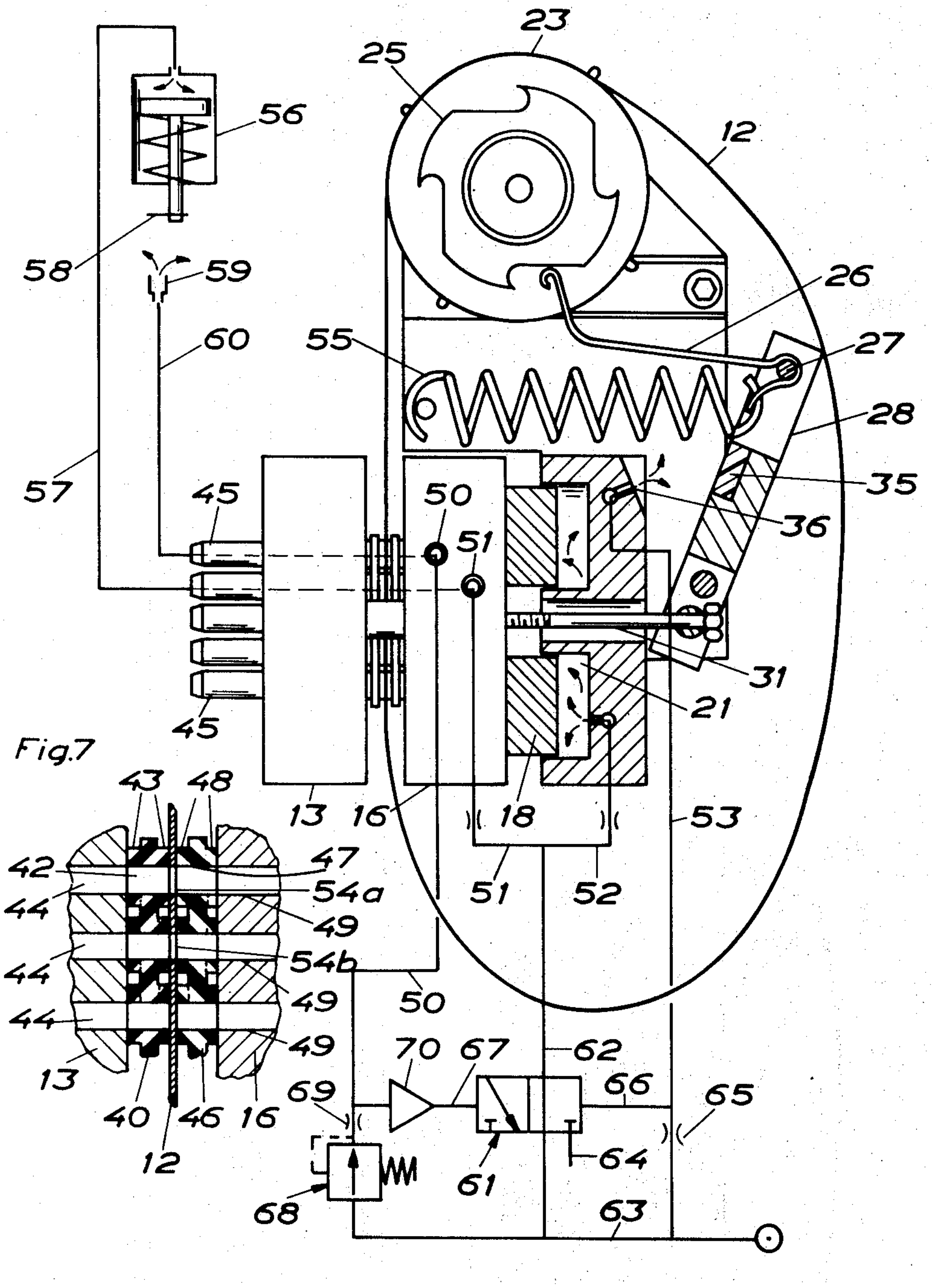
FIG. 6 is a side view, partly in section, and corresponding to FIG. 1 but showing the other embodiment, this figure being also a fragmentary circuit diagram of this embodiment as well of the embodiment of FIGS. 1–5.

FIG. 7, finally, shows some details in FIG. 6 at an enlarged scale.

Figures 1, 5:
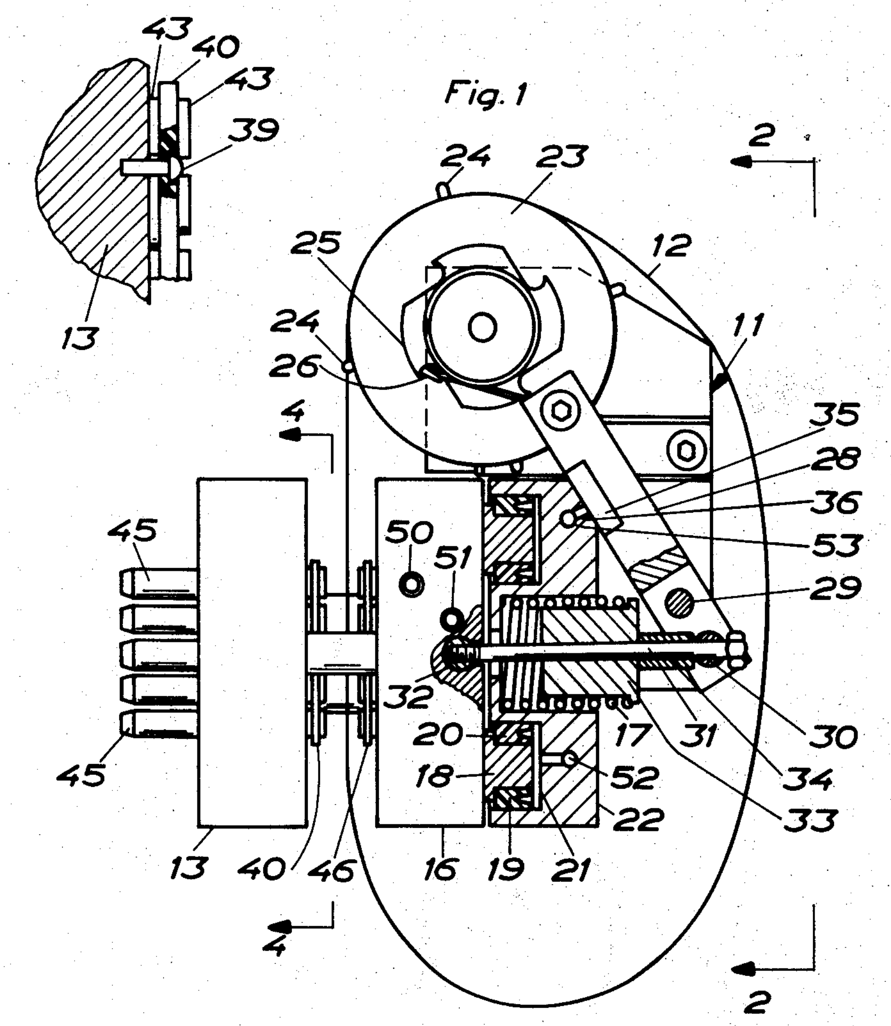
FIG. 1 is a side view, partly in section, of one of the embodiments, seen substantially as indicated by the arrows 1—1 in FIG. 2.
FIG. 5 is a section along line 5—5 in FIG. 4.
Figure 4:
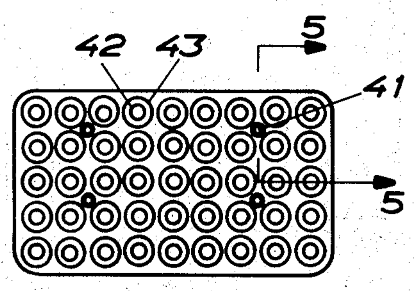
FIG. 4 is a fragmentary view along line 4—4 in FIG. 1.
Figure 2:
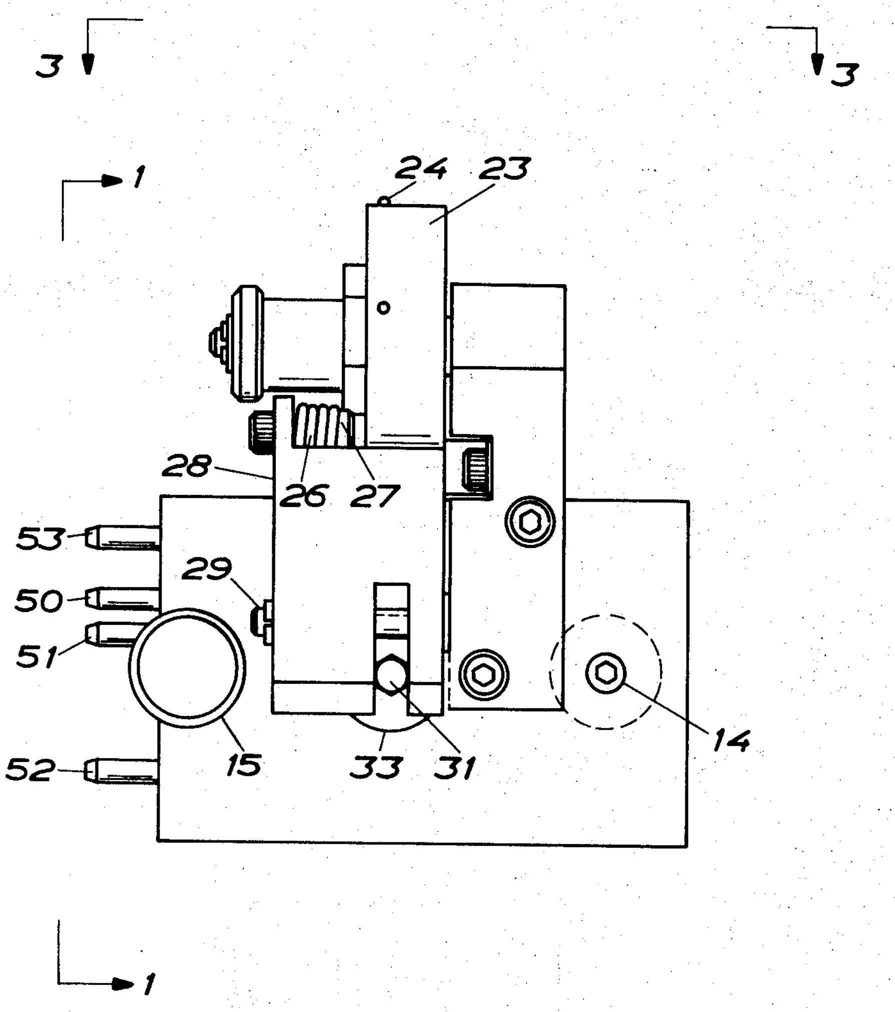
FIG. 2 is a side view seen as indicated by the arrows 2—2 in FIG. 1 and FIG. 3.

The reading device shown in FIGS. 1–5 has a frame 11 that can suitably be mounted inside a protection housing on a frame or stand for the machine or machines controlled by the device. A record carrier in the form of a perforated tape 12 in a closed loop can be clamped between a reader block 13 fastened in the frame 11 by means of two screws 14, 15 and a movably arranged reader block 16. The reader block 16 is constantly loaded by a coil spring 17 towards an open end position in which it is shown in FIG. 1. The reader block 16 has an annular portion 18 that, by means of sealings 19, 20 is sealed off against an annular recess 21 in a part 22 fixed to the frame 11 or being part of the frame. The annular portion 18 serves as a piston and overcomes the spring 17 and moves the reader block 16 to clamping position when compressed air is supplied through a passage 52 into the annular recess 21 which serves as a cylinder for the piston 18.

Figure 3:
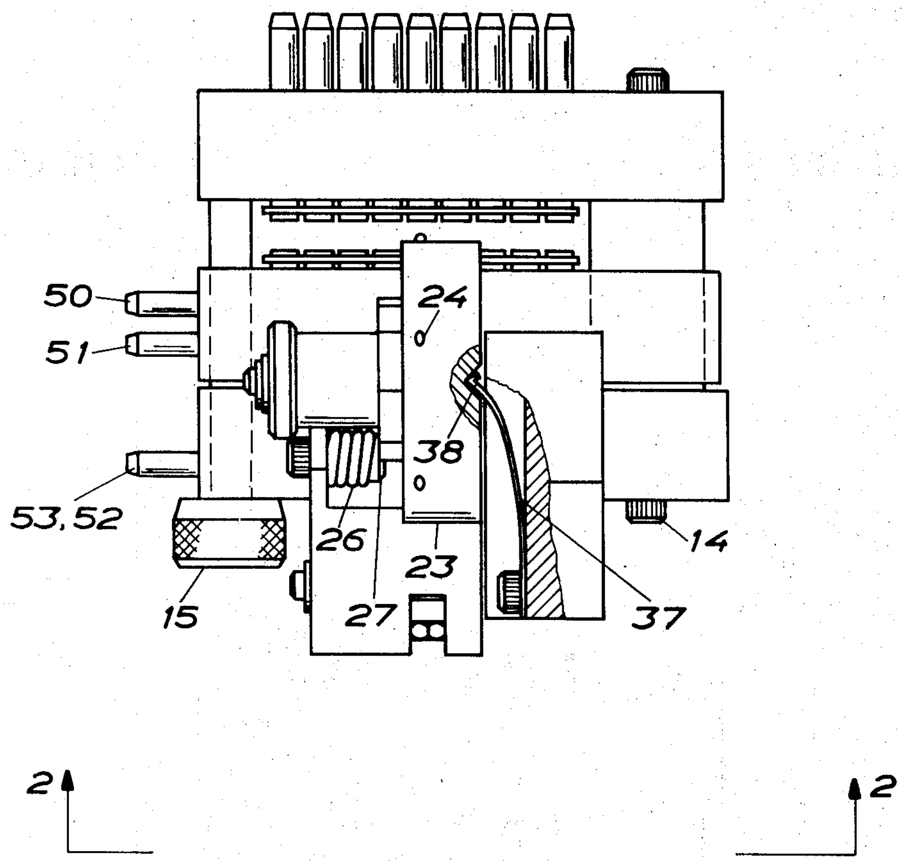
FIG. 3 is a horizontal view seen as indicated by the arrows 3—3 in FIG. 2.

The perforated tape 12, shown in FIG. 1 only, is reeled over a driver roller 23 that has sprockets 24 protruding into sprocket holes in the record carrier. The driver roller 23 has a cam curve with four cams 25 with which a feeder in the form of a resilient pawl 26 of piano wire engages. One end of the pawl is reeled some full turns around a bolt 27 on a lever 28 (see FIGS. 2 and 3) and fastened to the lever so that its other end will be resiliently biased against the cam curve, the cam curve 25 and the pawl 26 forming a pawl and ratchet mechanism or a free wheel mechanism. The lever 28 is swingable on a pivot 29 fastened in the frame 11, and it carries rotatably a pivot 30. The pivot 30 is connected to the movable reader block 16 by means of a long screw 31 that is coaxial with the annular piston 18 and extends through the pivot 30. The screw 31 is screwed into a ball 32 of a ball and socket joint in the movable reader block 16. The spring 17 is braced between the part 22 of the frame 11 and a shoulder on a sleeve 33 that is supported by the pivot 30 via a distance sleeve 34. In its end position, shown in FIG. 1, the lever 28 rests with a rubber plate 35 against a chamfer on the frame part 22, and the rubber plate holds a vent 36 closed, the vent serving as an indicator valve. As can be seen in FIG. 3, the angular position of the driver roller 23 and thereby the position of the perforated tape 12 is accurately defined by means of a leaf spring 37 which has snapped into one of four wedge formed recesses 38 on the side of the driver roller 23.

In the fixed reader block 13, there are four screws or rivets 39 and one of them is shown in FIG. 5. A rubber plate 40 has four holes 41 for these screws (FIG. 4) and it is forced over the heads of the screws as shown in FIG. 5. The plate has a number of holes 42 which on both sides of the plate are bounded by annular lands 43 moulded integral with the plate. Each hole 42 is aligned with one of a plurality of channels 44, FIG. 7, in the fixed reader block 13, and these channels lead individually to fittings 45, FIG. 1, which can be connected by means of hoses to the machine or machines the reading apparatus is to control. Half of the fittings 45 are intended to transmit order signals or transmit operation air and the other half are intended to be connected to indicator valves.

The movable reader block 16 has an indentical rubber plate 46 with holes 47 bounded by annular lands 48. These holes 47 are aligned with channels 49 in the reader block 16. Those of the channels 49 intended for indicating are supplied with compressed air as a group from a supply fitting 50 and those of the channels 49 intended for order or operation air are connected as a group to a supply fitting 51. Further, there is a supply fitting for the cylinder 21 connected to a supply conduit 52 and a supply fitting for the indicator vent 36 connected to a supply sonduit 53.

When the movable reader block 16 is in its clamping position, the channels 49 in the block and the holes 47 in the rubber plate 46 form with the channels 44 in the fixed block 13 and the holes 42 in the rubber plate 40 pairs of reading elements. If there are one or several of registering record holes 54*a* and 54*b*, respectively, in the perforated tape 12, leakfree signal lines are established from the movable reader block 16 to the fixed reader block 13 as shown in FIG. 7.

The embodiment shown in FIG. 6 differs from the one of FIGS. 1–5 only in that the feeder arm 26 has another geometrical form and in that the compression spring 17 is replaced by a tension spring 55 arranged between the frame 11 and the end of the feeder arm 26 so that this tension spring biases the movable reader block 16 towards its open position simultaneously with biasing the feeder arm 26 against the cam curve of the driver roller 23. In this figure, there is also shown a simple performing unit in the form of a pneumatic cylinder 56 controlled by the reading apparatus. The performing cylinder 56 can be supplied with compressed air through a conduit 57 connected to one of the fittings 45 belonging to the group of order and operation fittings. However, usually, operation air is not supplied directly from an order fitting 45 as shown but only order air for shifting a valve in an outer supply conduit of the performing unit. When the piston rod of the cylinder 56 is in its extended position a plate 58 shuts off a vent 59 which is connected by means of a conduit 60 to one of the fittings 45 of the group of indicator fittings. The supply conduits 50, 51, 52, 53 leading to the group of indicator fittings 45, to the group of order fittings 45, to the annular cylinder 21, and to the indicator vent 36 for the advance control, have been given the same reference numerals as their corresponding supply fittings. A pneumatically controlled memory valve 61 (bistable valve) controls a conduit 62 from which the conduits 51, 52 are branches. The valve 61 is supplied with compressed air from a main supply conduit 63 and is vented through a conduit 64. From the main supply conduit 63 air is also supplied through a restriction 65 to the conduit 53 to which the right control inlet 66 of the memory valve 61 is connected. The left control inlet 67 of the memory valve is connected to the conduit 50 and this conduit receives compressed air from the main supply conduit 63 through a pressure reducing valve 68 and a restriction 69. Because of the reduced pressure in the conduit 50, a pressure intensifier 70 is inserted between this conduit and the control inlet 67.

A cycle of advance will now be described with reference to the FIGS. 6 and 7. Assume that the memory valve 61 has just shifted to the position in which it is shown so that the annular piston 18 has just forced the reader block 16 to its clamping position as shown in FIG. 6. When the perforated tape 12 is clamped, a connection is established from the conduit 51 through the hole **54*b*, FIG. 7, in the perforated tape 12 and to the conduit 57 simultaneously with the conduit 50 being vented through the hole 54*a* in the perforated tape and the vent 59. All the other channels in the reader blocks 13, 16 are closed off by the tape 12. Thus, the piston of the performing cylinder 56 extends and at the end of the stroke, the plate 58 on the piston rod shuts off the vent 59. As a result, a back pressure builds up in the conduit 50 so that the memory valve 61 shifts to its non-illustrated right end position in which the performing cylinder 56 and the annular cylinder 21 are vented. By the tension spring 55 in FIG. 6 and the compression spring 17 in FIG. 1, respectively, the movable reader block 16 is forced to its open position shown in FIG. 1 and through the medium of screw 31 and lever 28, the feeder arm 26 starts its movement simultaneously with the reader block 16. However, the feeder arm 26 will not engage with a cam 25 until it has moved a certain distance, i.e. not until the perforated tape 12 has been released. When the lever 28 reaches its stop position, it closes the indicator vent 36, and, as a result, there is a pressure increase in the conduit 53. The memory valve 61 now shifts back to its position of FIG. 6 in which it supplies air to the annular cylinder 21 so that the tape 12 is being clamped in its new position and the feeder arm 26 moves back to its position shown in FIG. 6. Thus, the movement of the feeder arm 26 is longer than the distance between the cams of the driver roller 23. It is to be noted that the precise angular position of the driver roller 23 is not determined by the feeder arm 26 but by the spring 37 that snaps into the groove 38 so that the end position of the feeder arm 26** in its advance step is not critical but may be 1–2 mm from the precise position.

What we claim is:

1. Apparatus for reading a record carrier in the form of a perforated tape, comprising:

a frame, a first reader block affixed to the frame and having a plurality of channels terminating with sensing ports in a surface on which the tape is slidable, a second reader block movable towards and away from said first block, means for moving said second block towards and away from said second block, the second block having a plurality of channels with ports aligned with said ports in the first block to form pneumatic signal lines therewith when said ports register with holes in the tape and the second block is moved against the first block to clamp the tape therebetween, and a leverage means connected to said second block for transforming the movement of the second block away from its clamping position into an advancing movement of the perforated tape record carrier.

2. Apparatus as defined in claim 1, in which said moving means includes:

a spring arranged to bias the movable second block away from the fixed first block whereby to provide for the advancing of the record carrier, and a pneumatic piston means arranged to overcome the spring bias and to force the movable second block into the clamping position agaInst the fixed first block.

3. Apparatus as defined in claim 2, wherein said pneumatic piston means forces the second block into the clamping position when loaded by compressed air.

4. Apparatus as defined in claim 3, comprising:

a restricted first supply conduit, a plurality of vent valves, a second supply conduit, a plurality of output conduits, the two blocks each having:

a plurality of first pairs of cooperating ports arranged to establish pneumatic lines from a restricted first supply conduit to a plurality of vent valves when these first pairs of cooperating ports register with holes in the record carrier clamped between the blocks, and a plurality of second pairs of cooperating ports arranged to establish pneumatic lines from a second supply conduit to a plurality of output conduits adapted to supply compressed air to an output utilization means when these second pairs of cooperating ports register with holes in the record carrier clamped between the blocks, a restricted third supply conduit, a venting valve coupled to said third supply conduit and being closed by means of a member associated with the movable second block when the second movable block reaches its open limit position, a bistable valve with two pneumatic control inlets connected so as to supply air to, as well as to vent, said second supply conduit and said pneumatic piston means simultaneously, said bistable valve being arranged to be shifted to its venting position via one of its control inlets as a result of a pressure rise occurring in said first supply conduit as the vent valves connected to this supply passage are closed and arranged to be shifted to its pressurizing position via the other control inlet as a result of a pressure rise occurring in said restricted third supply conduit as the venting valve connected to said third supply conduit is closed by said member associated with the movable second block when the movable second block reaches its open limit position.

5. Apparatus as defined in claim 3, in which a position indicator is arranged to indicate an open position of the movable second block and connected to permit a supply of compressed air to said pneumatic piston means only when the movable second block has reached said open position.

6. Apparatus as defined in claim 5, in which said position indicator is arranged to indicate the limit position of the movable second block.

7. Apparatus according to claim 2, wherein said leverage means includes a lever and wherein said movable second block and the lever are interconnected by means of a rod arranged in parallel with the direction of movability of the movable second block, said pneumatic piston means being annular and coaxial with respect to said rod.

8. Apparatus as defined in claim 7, in which the rod has a spring support thereon and said spring is a compression spring arranged around said rod and braced between the frame and said support on the rod.

9. Apparatus as defined in claim 1, including an advancing device for effecting the tape advancing movement, the advancing device including a driver roller for pulling the record carrier tape in advancing steps and a pawl and ratchet mechanism for turning the roller, the leverage means being coupled to the pawl and ratchet mechanism.

10. Apparatus as defined in claim 9, in which the pawl and ratchet mechanism comprises a cam curve coaxial with and connected to the driver roller and having a plurality of cams, and a movement imparting arm mounted to the leverage means and biased against the cam curve.

11. Apparatus as defined in claim 10, in which said arm is pivotally mounted on the leverage means and a spring is interconnected between the frame and the arm so as to bias the arm against the cam curve simultaneously with biasing the movable block away from its clamping position.

12. Apparatus as defined in claim 10, in which the arm is arranged to move in its cam operating direction a distance longer than the distance between the adjacent cams so as to provide for play.

13. Apparatus as defined in claim 1, in which the ports of the fixed first block are connected to a number of flexible output conduits and the ports of the movable second block are connected to a supply conduit, the fixed block being detachable from the remainder of the reading device with said output conduits still connected to the block.

14. Apparatus as defined in claim 1, in which the cooperating ports of the blocks are associated with annular elastic sealing elements to seal against the record carrier when the blocks are forced together in their reading position.

15. Apparatus as defined in claim 14, in which said annular sealing elements are annular lands around holes in elastomeric plates attached to the respective block.

16. Apparatus as defined in claim 15, in which said plates have annular lands on both sides for sealing against the record carrier as well as against the respective block to which the respective plate is attached.

17. Apparatus as defined in claim 1, in which a roller is coupled to the tape, said leverage means being arranged to actuate said roller for pulling the tape to effect the tape advancing movement, and there is provided a means for turning the roller into a predetermined angular position when the roller is moved proximate to such a position by means of said leverage means.

18. Apparatus as defined in claim 17, in which said roller has wedge-formed recesses therein and said means for turning the roller to the predetermined angular position comprises a spring arranged to snap into said wedge-formed recesses in the roller.

19. Apparatus as defined in claim 17, in which said roller has wedge-formed recesses therein and said means for turning the roller to the predetermined angular position comprises a spring biased element arranged to snap into said wedge-formed recesses in the roller.

20. Apparatus as defined in claim 1, in which said channels of said second reader block are connected to a source of compressed air.

21. A reading apparatus for a program control system, comprising:

a frame, two cooperating blocks, one of which is fixedly mounted to the frame and the other of which is movable toward and away from the fixed block so as to be able to firmly clamp a record carrier between the blocks whereby to permit for a reading of the record carrier, a spring arranged to bias the movable block away from the fixed block whereby to provide for the advancing of the record carrier, a pneumatic piston means arranged to overcome the spring bias and to force the movable block into the clamping position against the fixed block, and an advancing device mechanically connected to the movable block for transforming the movement of the movable block away from its clamping position into an advancing movement of the record carrier, the advancing device including an element operatively interconnected with a play to another element so as to ensure that the advancing device does not impart an advancing movement to the record carrier until the movable block has moved so far in its movement away from the fixed block that the record carrier has become released.

22. A reading apparatus as defined in claim 21, in which said blocks have cooperating sensing ports forming pairs that are arranged to convey pneumatic signals from one of the blocks to the other when said pairs of ports register with holes in the record carrier clamped between the blocks.

23. Apparatus as defined in claim 21, comprising:

a restricted first supply conduit, a plurality of vent valves, a second supply conduit, a plurality of output conduits, the two blocks each having:

a plurality of first pairs of cooperating ports arranged to establish pneumatic lines from a restricted first supply conduit to a plurality of vent valves when these first pairs of cooperating ports register with holes in the record carrier clamped between the blocks, and a plurality of second pairs of cooperating ports arranged to establish pneumatic lines from a second supply conduit to a plurality of output conduits adapted to supply compressed air to an output utilization means when these second pairs of cooperating ports register with holes in the record carrier clamped between the blocks, a restricted third supply conduit, a venting valve coupled to said third supply conduit and being closed by means of a member associated with the movable second block when the second movable block reaches its open limit position, a bistable valve with two pneumatic control inlets connected so as to supply air to, as well as to vent, said second supply conduit and said pneumatic piston means simultaneously, said bistable valve being arranged to be shifted to its venting position via one of its control inlets as a result of a pressure rise occurring in said first supply conduit as the vent valves connected to this supply passage are closed and arranged to be shifted to its pressurizing position via the other control inlet as a result of a pressure rise occurring in said restricted third supply conduit as the venting valve connected to said third supply conduit is closed by said member associated with the movable second block when the movable second block reaches its open limit position.

24. Apparatus as defined in claim 21, in which the record carrier is in the form of a tape, and in which the advancing device includes a driver roller for pulling the record carrier tape in advancing steps, and a pawl and ratchet mechanism for turning the driver roller.

25. Apparatus as defined in claim 24, in which a means is associated with the driver roller for turning the latter to a predetermined angular position when the roller is moved proximate to such a position by means of said pawl and ratchet mechanism.

26. Apparatus as defined in claim 25, in which said means for turning the driver roller to the predetermined angular position comprises a spring or a spring biased element arranged to snap into wedge-formed recesses in the driver roller.

27. Apparatus as defined in claim 24, in which the advancing device includes a lever mounted to the frame and coupled to transmit the movement of the movable block to the pawl and ratchet mechanism.

28. Apparatus as defined in claim 27, in which the movable block and the lever are interconnected by means of a rod arranged in parallel with the direction of movability of the movable block, said pneumatic piston means being annular and coaxial with respect to said rod.

29. Apparatus for reading a record carrier in the form of a perforated tape, comprising:

a frame, a first reader block affixed to the frame and having a plurality of channels terminating with sensing ports in a surface on which the tape is slidable, said channels of the fixed block being connected by means of output conduits to units to be controlled by the reading apparatus, the fixed block being detachable from the remainder of the reading device with said output conduits still connected to the block, a second reader block movable towards and away from said first block and having a plurality of channels with sensing ports aligned with said ports in the first block to form pneumatic signal lines therewith when said ports register with holes in the tape and the second block is forced against the first block to clamp the record carrier therebetween, said channels of the movable block being connected to a supply conduit, means for effecting the movement of said second block, means for advancing the record carrier step by step into subsequent reading positions between the blocks, and means for effecting the movement of said second block to clamp and release the record carrier.

30. Apparatus for reading a record carrier in the form of a perforated tape, comprising:

a frame, a first reader block affixed to the frame and having a plurality of channels terminating with sensing ports in a surface on which the tape is slidable, a second reader block movable towards and away from said first block and having a plurality of channels with sensing ports aligned with said ports in the first block to form pneumatic signal lines therewith when said ports register with holes in the tape and the second block is forced against the first block to clamp the record carrier therebetween, means for effecting the movement of said second block, means for advancing the record carrier step by step into subsequent reading positions between the blocks, means for effecting the movement of said second block to clamp and release the record carrier, a first elastic plate attached to said first block and having annular lands on both sides for sealing against the record carrier and against said first block, the areas formed between the annular lands being vented to the atmosphere, and a second elastic plate attached to said second block and having annular lands on both sides for sealing against the record carrier and against said second block, the areas formed between the annular lands of said second plate being vented to the atmosphere.

31. A reading apparatus for a program control system, comprising:

a frame, two cooperating blocks, one of which is fixedly mounted to the frame and the other of which is movable towards and away from the fixed block so as to be able to firmly clamp a record carrier which is in the form of a tape between the blocks whereby to permit for a reading of the record carrier tape, means for effecting the movement of said movable block, and an advancing device mechanically connected to the movable block for transforming the movement of the movable block away from its clamping position into an advancing movement of the record carrier tape, the advancing device including a driver roller for pulling the record carrier tape in advancing steps, and a pawl and ratchet mechanism for turning the roller, the pawl being operatively arranged with a play relative to the ratchet so as to ensure that the advancing device does not impart an advancing movement to the record carrier tape until the movable block has moved so far in its movement away from the fixed block that the record carrier tape has become released.

32. Apparatus as defined in claim 31, in which the advancing device further includes a lever mounted to the frame and arranged to transmit the movement of the movable block to the pawl and ratchet mechanism.

33. A reading apparatus as defined in claim 32, in which a spring is arranged to bias the movable block away from the fixed block whereby to provide for the advancing of the record carrier tape, and a pneumatic piston means is arranged to overcome the spring and force the movable block into clamping position against the fixed block when loaded by compressed air, the movable block and the lever being interconnected by means of a rod parallel with the direction of movability of the movable block, and said pneumatic piston means being annular and coaxial with said rod.

* * * * *